March 25, 1958     J. D. BERKE     2,827,698
COMPOUND PLIERS
Filed March 6, 1957
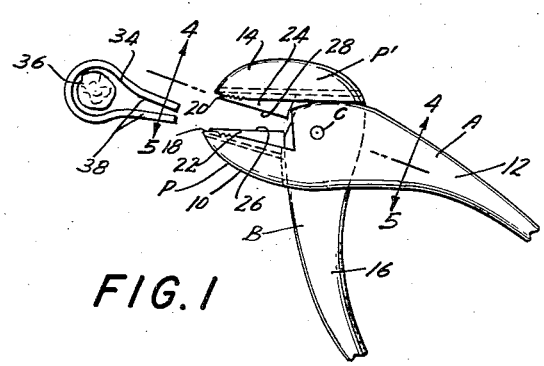
FIG.1
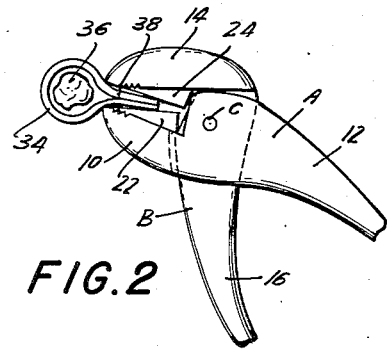
FIG.2
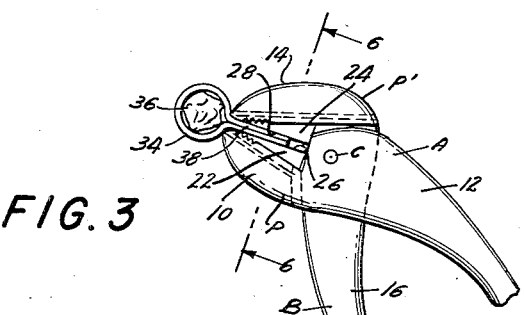
FIG.3
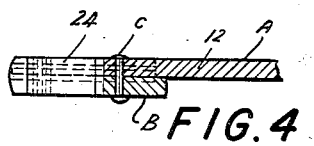
FIG.4
FIG.5
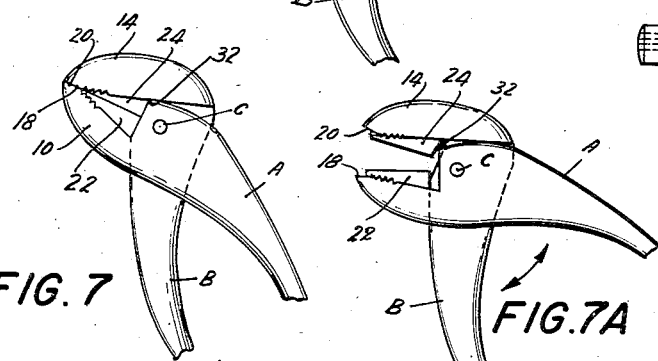
FIG.7
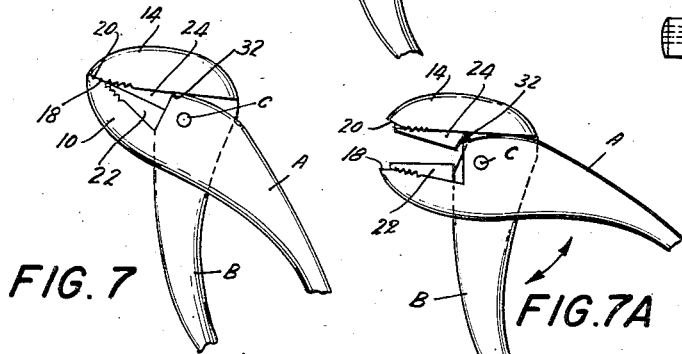
FIG.7A
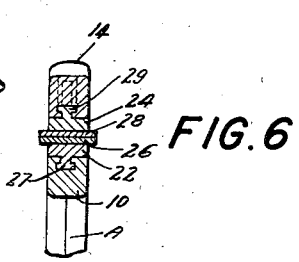
FIG.6
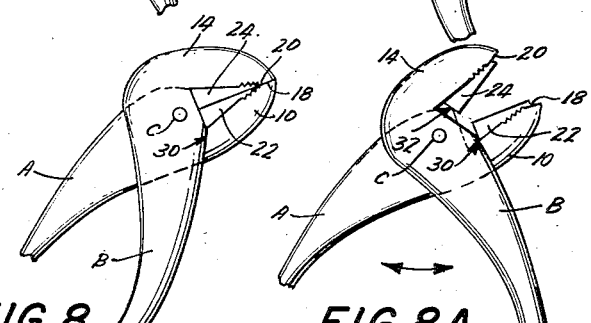
FIG.8
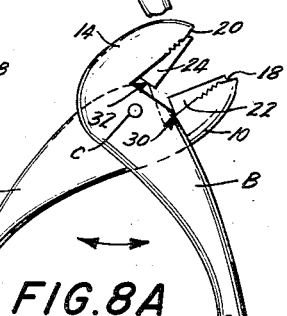
FIG.8A
INVENTOR.
JOSEPH D. BERKE
BY James F Franklin
ATTORNEY 
United States Patent Office 2,827,698
Patented Mar. 25, 1958

2,827,698

COMPOUND PLIERS

Joseph D. Berke, Jamaica Estates, N. Y.

Application March 6, 1957, Serial No. 644,412

4 Claims. (Cl. 32—66)

This invention relates to a tool particularly in the form of a pair of compound pliers designed to perform first a tightening action and then a clamping action on the work to be operated on.

The prime object of my present invention centers about the provision of a tool constructed in the form of a pair of pliers, the jaws of which function to exert a pulling or drawing action on the work operated on to contract or tighten the work about a work holder and then to clamp the ends of the work in its contracted or tightened condition.

A further prime object of the invention, in the particular embodiment exemplified, relates to the provision of a tool especially constructed as a dental pair of pliers, designed to form or make bands for teeth in the art or technique of orthodontia. For such use, in making or fitting a band about a molar or bicuspid tooth, it is necessary to pull or draw the band tightly about the tooth and then clamp the protruding ends of the thus tightened band and thereby obtain the exact form-fitting band unit required for further processing. With the pliers of the present invention, the jaws operate to first pull or draw together the ends of the band material and in such a way as to effect a form-fitting tightening of the band material about the tooth and to then clamp together the protruding band ends at the juncture of the encircling parts of the band.

To the accomplishment of these objects the present invention relates to the compound pliers as sought to be defined in the appended claims taken together with the following specification and accompanying drawings in which—

Fig. 1 is an elevational view of the compound pair of pliers shown in plier-open position and exemplifying its use as a dental tool;

Fig. 2 is a similar view of the same showing the pliers in the process of being closed;

Fig. 3 is a similar view of the same showing the pliers in a closed position;

Fig. 4 is a view thereof taken in cross-section in the plane of the line 4—4 of Fig. 1;

Fig. 5 is a view thereof taken in cross-section in the plane of the line 5—5 of Fig. 1;

Fig. 6 is a cross-section of the same taken in the plane of the line 6—6 of Fig. 3;

Fig. 7 is a view of the pliers shown in closed position;

Fig. 7A is a view of the same shown in open position;

Fig. 8 is a view of the pliers taken from the side opposite to that shown in Fig. 7 and showing the pliers in closed position; and Fig. 8A is a view similar to Fig. 8 and showing the pliers in an open position.

Referring now more in detail to the drawings, the compound pliers of the invention comprise two plier members A and B pivotally joined at C, each plier member having a jaw and a handle on opposite sides of the pivot, the plier member A having the jaw 10 and the integral handle 12, and the plier member B having the jaw 14 and the integral handle 16. The jaws 10 and 14 terminate in mating clamping parts 18 and 20.

The jaws 10 and 14 are provided with mating gripping members 22 and 24, one in each jaw, the said gripping members 22 and 24 being slidable forwardly towards and rearwardly away from the clamping parts 18 and 20 of said jaws. The said gripping members are formed with the mating gripping surfaces 26 and 28. The said gripping members 22 and 24 are held in or secured to the jaws 10 and 14 constrained for slidable movement only by forming the gripping members with T-shaped keys or tenons 27 and 29 respectively (see Fig. 6) slidable in similarly shaped key-ways in said jaws.

Means are provided, all formed integrally with the parts thus far described, for moving the gripping members 22 and 24 forwardly towards the clamping parts of the jaws upon opening motion of the pliers and for moving said gripping members rearwardly away from the clamping parts of the jaws when the pliers are closed upon the work to be operated on.

The means for moving the gripping members forwardly comprises for each gripping member a part on one plier member engaging and moving the gripping member that is mounted on the jaw of the other plier member. Thus for moving the gripping member 22 (mounted on the plier member A) forwardly means is formed on the plier member B; and similarly for moving the gripping member 24 (mounted on the plier member B) forwardly means is formed on the plier member A. The means for moving forwardly the gripping member 22 upon opening motion of the pliers is best shown in Figs. 8 and 8A of the drawings. This comprises a camming surface 30 formed on the plier member B. Upon opening the plier members A—B (movement between the positions shown in Figs. 8 and 8A) the said camming surface 30 engages the gripping member 22 to move the same forwardly towards the clamping part 18 of the jaw 10. The means for moving the gripping member 24 forwardly is best shown in Figs. 7 and 7A of the drawings. This comprises a camming surface 32 formed on the plier member A. Upon opening the plier members A—B (movement between the positions shown in Figs. 7 and 7A of the drawings) the said camming surface 32 engages the gripping member 24 to move the same forwardly towards the clamping part 20 of the jaw 14. It will be seen, particularly from Figs. 1, 7A and 8A of the drawings, that with the opening of the pliers and the movement of the gripping members forwardly, the gripping members are in a position whereby upon subsequent closing motion of the pliers the faces 26 and 28 of the gripping members are in a position to be brought into engagement with the work to be operated on.

The gripping members 22 and 24 are mounted on the jaws 10 and 14 respectively for said slidable movement along planes inclined with reference to the gripping faces 26 and 28 of the gripping members, such that upon continued closing motion of the pliers the gripping members are cammed rearwardly by such inclined plane mounting thereby pulling or drawing the work that is gripped between them. Thus the gripping member 22 is mounted to slidably move in the jaw 10 in a plane $p$ inclined to the plane of the gripping surface 26 of the gripping member; and similarly the gripping member 24 is mounted to slidably move in the jaw 14 in a plane $p'$ inclined to the plane of the gripping surface 28 of the gripping member 24 (see particularly Figs. 1 and 3 of the drawings). The gripping members 22 and 24 are structurally wedge shaped. With this described slidable mounting of the gripping members along planes inclined with reference to the gripping faces of the gripping members, continued closing motion of the pliers causes the gripping members to be cammed rearwardly, from the position shown in Fig. 1 through the position shown in Fig. 2 and to the position shown in Fig. 3 of the drawings, thereby pulling or drawing the work that is gripped between them. Toward the end of this described movement the clamping parts 18 and 20 of the jaws are fully exposed and are now in a position to exert a clamping action on the work to be operated upon, so that as the pliers are moved to closed position the work is first drawn or pulled by the action of the gripping members and then the work is clamped between the jaws of the pliers at the clamping ends thereof.

The operation of the described tool, as applied to form or make bands for teeth in the art or technique of orthodontia is illustrated in Figs. 1 to 3 of the drawings. Band material 34 is placed about a tooth 36 with the termini 38 of the band material protruding for operation by the dental pliers. Upon movement of the pliers to open position the gripping members 22 and 24 are advanced or moved forwardly and are in a position to grip the band termini 38. As the handles 12 and 16 of the pliers are operated to close the jaws 10 and 14 of the pliers the gripping members 22 and 24, acted upon by the gripping force between them, are cammed rearwardly by virtue of their inclined mounting in the jaws, and the band termini 38 are pulled or drawn rearwardly within the jaws of the pliers, thereby effecting a tightening of the band 34 about the tooth 36, as illustrated in the sequence of views depicted by Figs. 2 and 3 of the drawings. As the jaws are moved to their final closed position the band material is contracted or tightened to its tooth form-fitting condition at which time the clamping parts 18 and 20 of the jaws act to clamp together the protruding band termini 38 at the juncture of the encircling part of the band material as best illustrated in Fig. 3 of the drawings. It will be understood that the forward and rearward movement of the gripping members 22 and 24 similarly takes place upon the opening and closing of the pliers in the absence of any work to be operated upon. It will be further seen that the tool is designed with a minimum of moving parts and with the actuation of the moving parts effected by the structure and mounting of such parts thereby eliminating the need for any additional operating or motion producing members.

The structure, mode of operation and use of the compound pliers of the present invention will be fully apparent from the above detailed description thereof. It will be further apparent that while I have shown, the principles of the present invention embodied in a dental appliance or tool for use in the orthodontic field that the tool may be used for other purposes where a similar sequence of action is desired and that many changes in form, structure or appearance may be made therein without departing from the spirit of the invention defined in the following claims.

I claim:

1. A pair of compound pliers for drawing and then clamping work to be operated on comprising two pivotally joined plier members, each having a jaw and a handle on opposite sides of the pivot, the jaws terminating in mating clamping parts, mating gripping members, one in each jaw slidable forwardly towards and rearwardly away from the clamping part of said jaw, means movable upon opening motion of the pliers for moving the gripping members forwardly whereby upon subsequent closing motion of the pliers the faces of the gripping members are brought into engagement with the work to be operated on, each gripping member being mounted on its related jaw for said slidable movement along a plane inclined with reference to the gripping face of said gripping member, whereby upon continued closing motion of the pliers the gripping members are cammed rearwardly thereby drawing said work gripped between them, and whereby the clamping parts of said jaws are then brought together to clamp said work.

2. A pair of compound pliers for drawing and then clamping work to be operated on comprising two pivotally joined plier members, each having a jaw and a handle on opposite sides of the pivot, the jaws terminating in mating clamping parts, mating gripping members, one in each jaw slidable forwardly towards and rearwardly away from the clamping part of said jaw, means unitary with said plier members operative for moving the gripping members forwardly upon opening motion of the pliers whereby upon subsequent closing motion of the pliers the faces of the gripping members are brought into engagement with the work to be operated on, each gripping member being mounted on its related jaw for said slidable movement along a plane inclined with reference to the gripping face of said gripping member, whereby upon continued closing motion of the pliers the gripping members are cammed rearwardly thereby drawing said work gripped between them, and whereby the clamping parts of said jaws are then brought together to clamp said work.

3. The compound pliers of claim 2 in which the means for moving the gripping members forwardly comprises for each gripping member a part on one plier member for engaging and moving the gripper member that is mounted on the jaw of the other plier member.

4. A pair of compound pliers for drawing and then clamping work to be operated on comprising two pivotally joined plier members, each having a jaw and a handle on opposite sides of the pivot, the jaws terminating in mating clamping parts, mating gripping members, one in each jaw slidable forwardly towards and rearwardly away from the clamping part of said jaw, means formed in each plier member operative upon opening motion of the pliers for engaging and moving forwardly the gripping member that is slidable in the jaw of the opposite plier member, whereby upon subsequent closing motion of the pliers the faces of the gripping members are brought into engagement with the work to be operated on, each gripping member being wedge shaped and being mounted on its related jaw for said slidable movement along a plane inclined with reference to the gripping face of said gripping member, whereby upon continued closing motion of the pliers the gripping members are cammed rearwardly thereby drawing said work gripped between them, and whereby the clamping parts of said jaws are then brought together to clamp said work.

References Cited in the file of this patent

UNITED STATES PATENTS 2,725,632   Rabben _____ Dec. 6, 1955

FOREIGN PATENTS 155,844   Sweden _____ Sept. 12, 1952